United States Patent [19]
Luscombe

[11] 3,840,134
[45] Oct. 8, 1974

[54] HAYSTACK WAGON
[76] Inventor: Gene A. Luscombe, R. R. 1, Dilliver, Iowa
[22] Filed: Apr. 23, 1973
[21] Appl. No.: 353,699

[52] U.S. Cl............... 214/518, 214/83.36, 100/210
[51] Int. Cl............................................. B60p 1/38
[58] Field of Search .......... 214/501, 508, 509, 518, 214/519, 520, 521, 522, 83.36, 83.26; 100/210

[56]  References Cited
UNITED STATES PATENTS
3,556,327  1/1971  Garrison ........................... 214/82 X
3,744,228  7/1973  Lundahl .......................... 214/522 X Primary Examiner—Albert J. Makay
Attorney, Agent, or Firm—Williamson, Bains & Moore

[57]  ABSTRACT
A hay stack wagon includes a generally rectangular shaped wagon box having an endless conveyor mounted on the floor of the wagon box which may be driven in reverse directions to assist in unloading formed hay stacks from the wagon box, and assist in reloading hay stacks into the wagon box. The hay stack wagon also has rear doors which are opened during the unloading and reloading operations, and the wagon box is pivotally supported on ground engaging wheel assemblies to permit rearward tilting of the wagon box for unloading and reloading hay stacks. The side walls of the wagon box may be shifted outwardly from a normal position to thereby increase the width of the box and facilitate reloading of the hay stack into the wagon box. A compaction roller is positioned within the wagon box and is continuously driven in forward and rearward directions during the hay collecting operation to continuously and evenly compact the hay as it is being collected.

10 Claims, 16 Drawing Figures

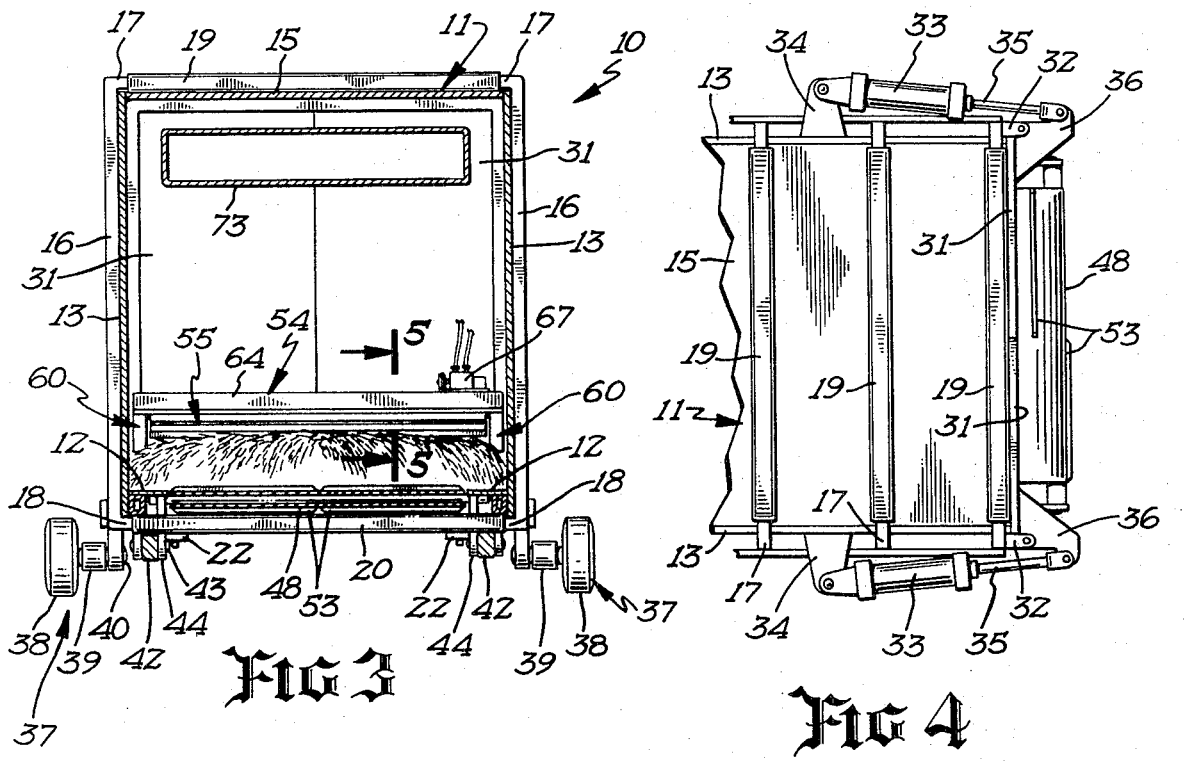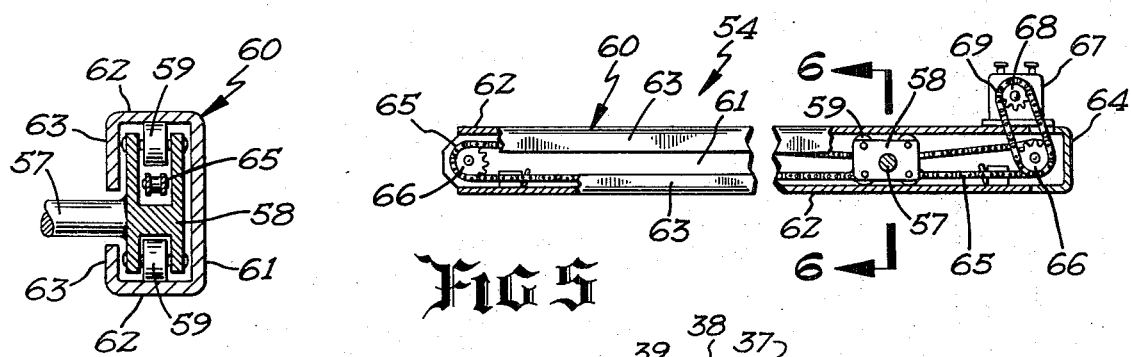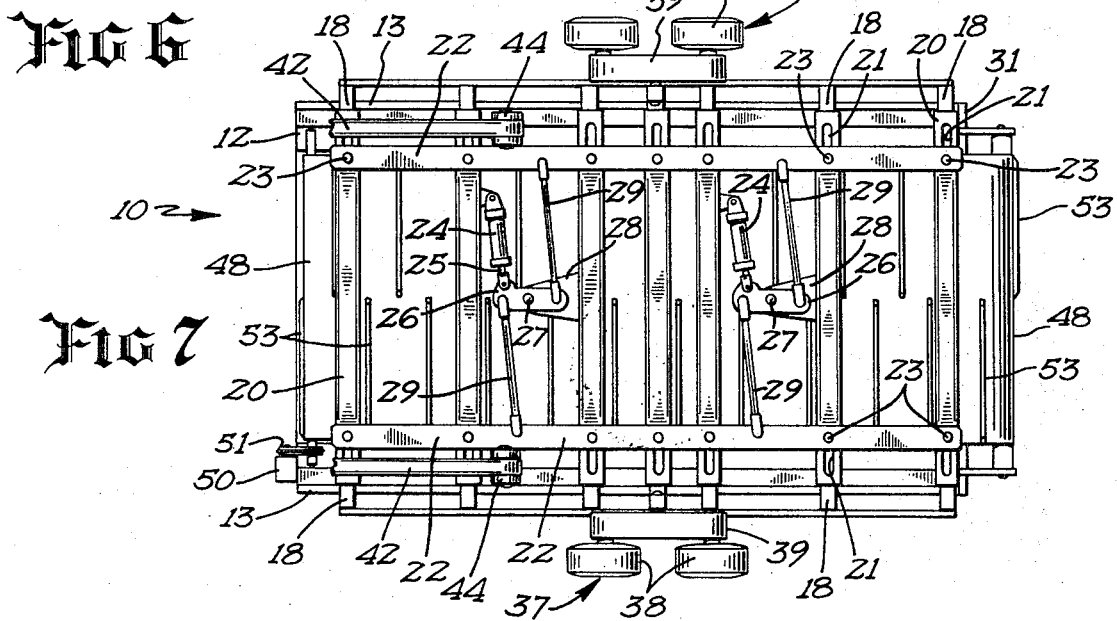

HAYSTACK WAGON

BACKGROUND OF THE INVENTION

This invention relates to a hay stack wagon which is adapted to be towed by a tractor and which is adapted to receive hay from a pickup mechanism to form the hay into a stable stack.

Certain prior art hay stack wagons merely collect hay from a pickup device and unload the stacked hay when the wagon is filled. Since the hay has not been compacted with this type of prior art hay wagon, the stack formed is highly unstable and tends to crumble. In other types of commercial hay stack wagons, the hay is compacted periodically either by urging the top wall or the front wall against the hay. However, hay stacks which are formed with that type of stack wagon have well defined horizontal or vertical cleavage planes which are defined by the periodic compression step. In other words, if the hay is compressed by moving the top wall periodically against the hay, each time the top wall compresses the hay, the cleavage line is defined along the surface which is compressed. Similar vertical cleavage lines are defined when the front wall is used to periodically compress the hay. These hay stacks are also unstable because of these cleavage lines. Further, none of these prior art hay stack wagons have made provision for reloading formed stacks into the stack wagon.

SUMMARY OF THE INVENTION

It is an object of this invention to provide a hay stack wagon with a compaction roller structure which continuously compacts the hay as the hay is collected. The compaction roller structure is power driven by reversible drive means to permit continuous forward and rearward movement of the roller structure along the surface of the hay as it is being collected. Thus the present hay stack wagon permits the formation of stable compacted hay stacks.

The floor or bottom wall of the hay wagon has an endless conveyor mounted thereon and the stack wagon is tiltable between a normal horizontal position and a rearward inclined position. With this arrangement, the hay stack may be readily unloaded from the stack wagon or alternatively, may be reloaded into the hay stack wagon. The side walls of the stack wagon may be shifted outwardly to increase the width of the wagon and to thereby facilitate reloading of the hay stack.

Although the stack wagon has been described as being especially useful in forming stable stacks of hay, the stack wagon is also useful in forming stacks of cornstalks, cotton, and the like.

BRIEF DESCRIPTION OF THE DRAWINGS

FIG. 3 is a vertical cross sectional view taken approximately along line 3—3 of FIG. 2 and looking in the direction of the arrows.

FIG. 4 is a fragmentary top plan view of the rear portion of the hay stack wagon.

FIG. 5 is a cross sectional view taken approximately along line 5—5 of FIG. 3 and looking in the direction of the arrows.

FIG. 6 is a cross sectional view taken approximately along line 6—6 of FIG. 5 and looking in the direction of the arrows.

FIG. 7 is a bottom plan view of the lower wall of the hay stack wagon.

DETAILED DESCRIPTION

Figure 1:
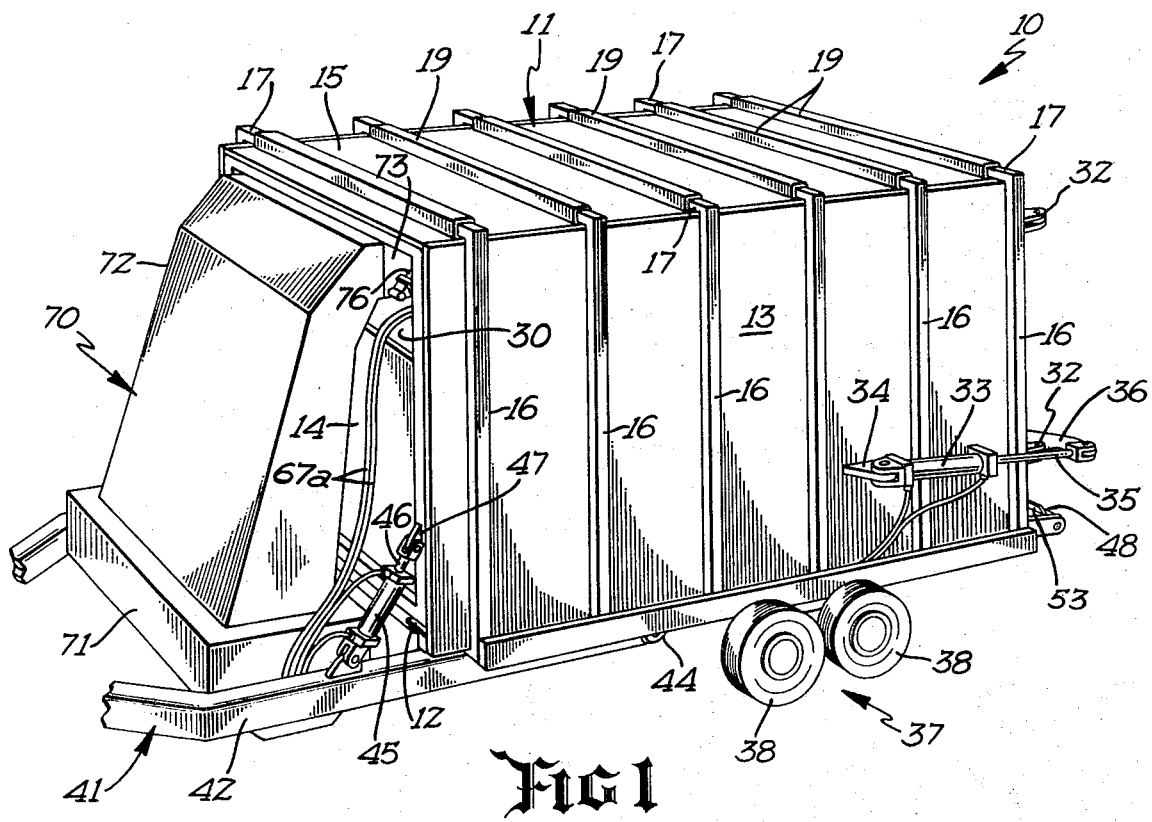
FIG. 1 is a front perspective view of the hay stack wagon.

Referring now to the drawings and more specifically to FIG. 1, it will be seen that one embodiment of the novel hay stack wagon, designated generally by the reference numeral 10, is thereshown. The hay stack wagon 10 includes a wagon box or body 11 which is of generally rectangular configuration and which includes a bottom wall or floor 12, opposed substantially parallel side walls 13, a front wall 14, and a top wall 15. The side walls 13 are each provided with vertical frame members 16 which are longitudinally spaced apart and each frame member includes an upper horizontal portion 17 and lower horizontal portion 18. It will be noted that the upper and lower horizontal portions extend at right angular relation from the vertical frame members.

The top wall 15 is provided with a plurality of longitudinally spaced apart transversely extending tubular or hollow frame members 19 which are affixed to the upper surface thereof. The bottom wall 12 is also provided with a plurality of longitudinally spaced apart hollow frame members 20 which are affixed to the lower surface thereof. Each frame member 19 is disposed in the same vertical plane as one of the frame members 20. Each frame member 19 on the upper wall and each frame member 20 on the lower wall respectively receive the upper and lower portions of a vertical front frame member 16 in telescoping relation as best seen in FIGS. 1, 3 and 7.

Each of the lower tubular members 20 is provided with a pair of downwardly opening elongate slots 21 therein, each slot being located adjacent one end of the tubular member. A pair of outwardly spaced apart longitudinally extending elongate connecting straps 22 are psoitioned closely adjacent and below the frame members 20. Each connecting strap is provided with a plurality of vertically extending pins 23 which project through the slots 21 and which are connected to the ends of the lower horizontal portions 18 of the vertical frame member 16.

A pair of double acting hydraulic cylinders 24 are each mounted by a suitable bracket and one of the tubular frame members 20. Each hydraulic cylinder 24 has a piston therein which is connected to a piston rod 25, each piston rod being connected to one of a pair of ball cranks or levers 26. Each lever 26 is pivotally connected by a pivot 27 to one of a pair of brackets 28, each being carried by one of the frame members 20. Each lever 26 is also pivotally connected to one end of an elongate motion transmitting link 29, the other end of the motion transmitting link being pivotally connected to one of the connecting straps 22. With this arrangement, it will be seen that when the double acting hydraulic cylinders 24 are actuated to extend the piston rods 25, the side walls 13 of the wagon box will be shifted outwardly away from each other, and when the piston rods 25 are retracted, the side walls 13 will be returned to their normal position adjacent the edges of the top and bottom walls. Shifting the side walls 13 outwardly from there normal position increases the width of the wagon box and facilitates reloading of a hay stack in a manner to be described more fully hereinbelow.

Referring again to FIGS. 1, 2 and 8, it will be seen that the front wall 14 does not extend upwardly to the top wall 15 whereby an inlet opening 30 is defined between the upper edge of the front wall and the top wall. The inlet opening 30 extends between the side walls and is adapted to receive the discharge spout of the pickup device.

The rear of the wagon box 11 is provided with vertical rear wall comprised of a pair of doors or closure structures 31 which are hingedly mounted by hinges 32 on the side walls for swinging movement about vertical axes between open and closed positions. The hinges may be mounted directly on the side walls or alternatively on the rearmost vertical frame members 16. The means for opening are closing the doors 31 comprises a pair of double acting hydraulic cylinders 33 each mounted by a suitable bracket 34 to one of the side walls 15 intermediate the ends of the latter. The piston rod 35 of each hydraulic cylinder is connected to a bracket 36 which in turn is mounted in one of the doors 31. It will be seen that when the piston rod 35 of each hydraulic cylinder is extended, the doors 31 will be closed and when the piston rod 35 is retracted, the doors will be open.

Figure 2:
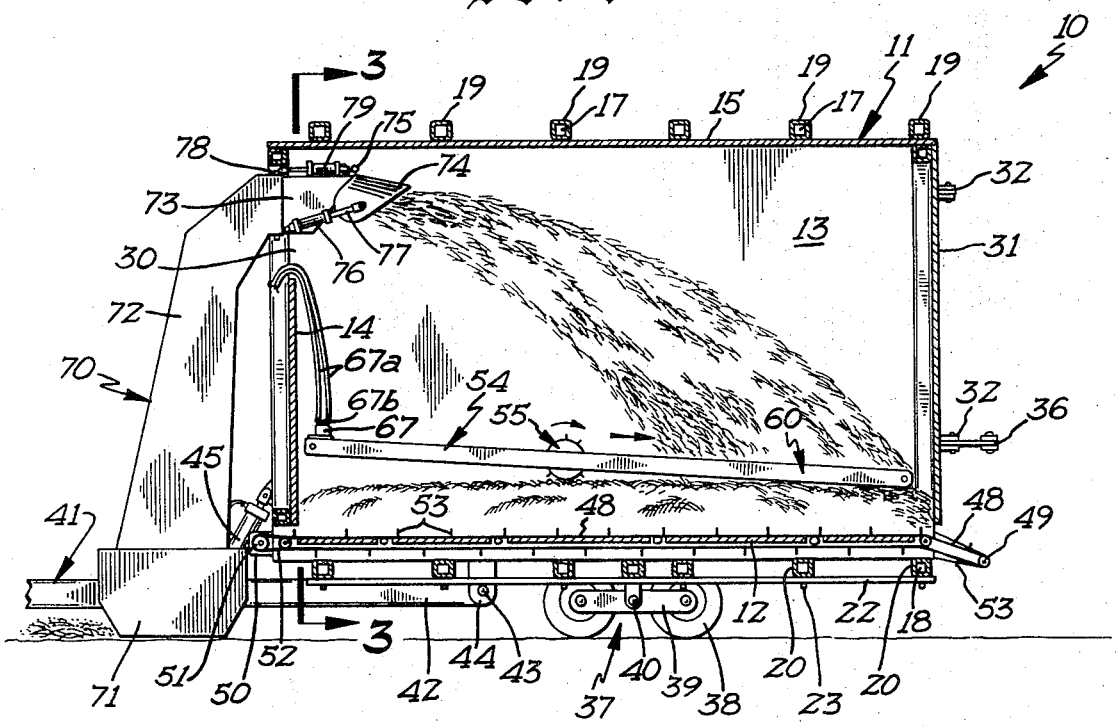
FIG. 2 is a longitudinal cross sectional view of the hay stack wagon when the wagon is in its normal horizontal position.
Figure 8:
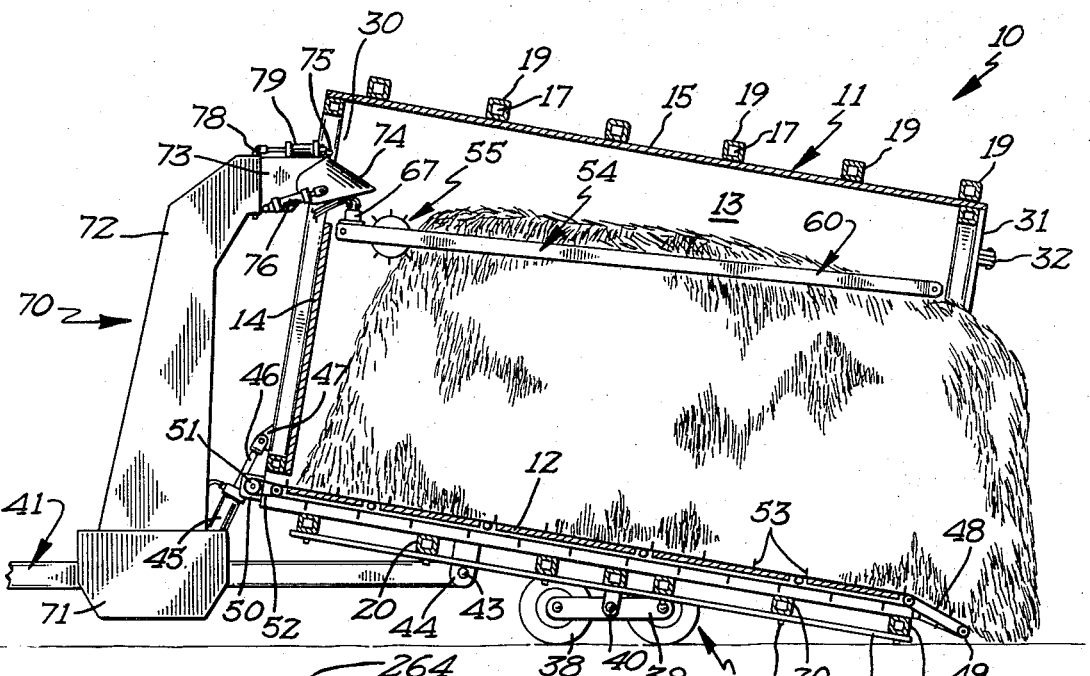
FIG. 8 is a longitudinal sectional view of the hay stack wagon similar to FIG. 2 but illustrating the wagon in a rearwardly inclined position.

The wagon box 11 is mounted for travel along the surface of the ground by a pair of wheel assemblies 37. Each wheel assembly 37 includes a pair of tire mounted wheels 38 whose axles are secured to a tandem frame 39. It will be noted that the wheels 38 of each wheel assembly is positioned laterally and exteriorly of the wagon box 11. Each tandem frame 39 is pivotally connected by a pivot 48 with one of a pair of downwardly projecting brackets 40 which are mounted on the wagon box 11 adjacent each side thereof. With this arrangement, the wagon box may tilt about a transverse axis between a normal horizontal position, as illustrated in FIG. 2, and a rearward tilted position as illustrated in FIG. 8. The hay stack wagon 10 is of the towed type and is connected to a tractor or other prime remover. Thus the stack wagon 10 includes a hitch frame 41 which is only partially illustrated in FIG. 1 but which is provided with suitable coupling mechanism (not shown) for connection to the tractor hitch. The hitch frame 41 includes a pair of longitudinally extending elongate hitch frame members 42 each being pivotally connected by a pivot 43 to a bracket 44 secured to the wagon box and extending forwardly therefrom. It is pointed out that the brackets 44 and brackets 40 are preferably secured to frame members 20 of the bottom wall.

Means are provided for tilting the wagon box about the pivotal axis defined by the pivots 40 between the normal horizontal position and the rearwardly inclined position. This means includes a pair of double acting hydraulic rams or cylinders 45 each being secured by a bracket to one of the longitudinal frame members 42. The piston rod 46 of each hydraulic cylinder 45 is connected to a bracket 47 which is secured to the forwardmost vertical frame members 16. It will be seen that when the piston rods 46 are retracted, the wagon box will be maintained in a horizontal position, but when the piston rods 46 are extended, the wagon box will be tilted about a transverse axis to the rearwardly inclined position.

The hay stack wagon 10 is also provided with an endless belt type conveyor 48 which as trained about suitable rollers 49. It willbe noted that conveyor 48, which is driven by a rotary hydraulic motor 50, has a rear end portion which extends rearwardly of the wagon box. The hydraulic motor 50 is mounted at the forward end of the conveyor 48 and is provided with a drive sprocket 51 which is secured to the output shaft thereof and about which is trained a endless drive chain 52. The drive chain 52 is also trained about a driven sprocket 49a which is secured to the shaft of the front roller for the endless conveyor 48. It will be noted that the endless conveyor belt is provided with a plurality of outwardly projecting conveyor elements 53. Suitable longitudinally spaced apart support rollers are provided and each extends transversely of the floor 12. The hydraulic motor 50 which drives the endless belt conveyor is of the reversible type and this arrangement permits the upper run of the conveyor to be driven in a rearward or forward direction.

Figure 9:
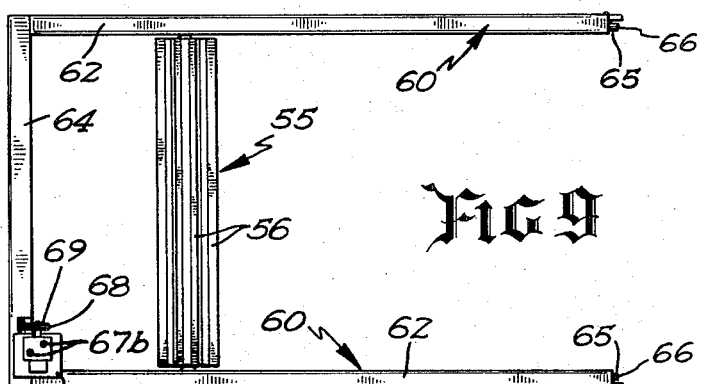
FIG. 9 is a top plan view of the compacting mechanism.

Means are also provided for continuously compacting the hay as the hay is being collected in the stack wagon and this means includes a compaction mechanism 54. The compaction mechanism 54 includes an elongate drum type compaction roller structure 55 which is provided with a plurality of circumferentially spaced apart elements 56 which project radially outwardly therefrom. It will be noted that these traction elements 56 extend throughout the length of the roller structure 55 as best seen in FIG. 9.

The compaction roller structure 55 is journalled on a axle 57. A pair of slide blocks 58 are each affixed to one end of the axle 57 and each slide block is provided with a plurality of rollers 59 as best seen in FIGS. 5 and 6. The slide 58 are disposed within a pair of channel shaped tracks 60 each including a web portion 61 having a pair of flanges 62 integrally formed therewith, each flange terminating in terminal portions 63 which extend toward each other. A transverse member 64 extends between and rigidly interconnects the track members at the front end thereof as best seen in FIG. 9. Referring again to FIG. 6, it will be seen that when the slide blocks 58 are urged in a forward or rearward direction in the tracks 60, the roller structure 55 will be revolved and caused to travel in a forward or rearward direction.

Means are provided for shifting said slide blocks and said roller structure in a fore and aft direction and this means includes a pair of drive chains 65 which are secured to the slide blocks 58 as best seen in FIG. 5. Each drive chain 65 is trained about a pair of spaced apart sprockets 66, the latter being journalled at opposite ends of the associated track 60. A rotary hydraulic motor 67 is mounted on the transverse member 64 and the drive shaft thereof is provided with a drive sprocket 68. An endless drive chain 69 is trained about the drive sprocket 68 and is also trained about a driven sprocket 60a keyed to the shaft of one of the front sprockets 66.

The hydraulic motor 67 is reversible and when driven in one direction will cause the compaction roller structure to move along the surface of the hay from the front of the wagon box towards the rear. Suitable limit switches 58a are mounted adjacent opposite ends of one of the tracks 60 and are disposed in obstructing relation with respect to the associated slide block 58. The limit switches 58a control the circuits (not shown) which control operation of the hydraulic motor 67 in either a reverse or forward direction. Thus it will be seen that when the roller engages one limit switch, motor will be driven in one direction until the slide block thereafter engages the other limit switch which immediately reverses operation of the hydraulic motor. With this arrangement, the compaction roller is revolved in a rearward and forward direction along the surface of the hay continuously compacting the same. It will also be noted that while the compaction roller 55 is driven in a fore and aft direction by the hydraulic motor 67, the compaction roller 55 is actually being pulled in both directions by the drive chains 65.

Referring again to FIGS. 1, 2 and 8, it will be seen that a pickup mechanism 70 is mounted forwardly of the stack wagon 10 and is preferably of the fan type which creates a negative pressure and blows the cut hay into the stack wagon. The pickup device 70 includes a downwardly opening fan housing 71 in which is positioned a pickup fan (not shown). The fan housing 71 is connected in communicating relation to a generally vertically extending conduit 72 which terminates in a discharge spout 73 that projects through the inlet opening 30 of the wagon box.

The discharge spout 73 has a deflector 74 hingedly mounted thereon by a hinge 75 which permits vertical swinging movement of the deflector about a substantially horizontal axis. A double acting hydraulic cylinder 76 is pivotally mounted on the spout 73 and has a piston rod 77 which is pivotally connected to the deflector 74. Extension and retraction of the piston rod 77 produces vertical swinging movement of the deflector 74. The discharge spout 73 is also hingedly connected by means of a hinge 78 to the conduit 72 to permit lateral swinging movement of the spout about a substantially vertical axis. A double acting hydraulic cylinder 79 is mounted on the deflector and has a piston rod which is connected with the hinge connecting 78. Extension and retraction of the piston rod of the hydraulic cylinder cause lateral swinging movement of the discharge spout 73. With this arrangement, the deflector 74 may be shifted vertically thus controlling the discharge of the hay longitudinally of the stack wagon while the discharge spout may be shifted laterally from side to side thus controlling lateral discharge of the hay with respect to the stack wagon.

In operation, the hay stack wagon 10 will be connected to a tractor or other prime mover and the pickup device will be positioned forwardly of the wagon so that the discharge spout projects through the opening 30 in the wagon. During the hay collection operation, the doors 30 will be in a closed condition and the hydraulic motor controlling operation of the endless belt conveyor 48 will be in a deenergized condition. As the hay is discharged from the pickup device, the deflector may be continuously raised and lowered at a predetermined rate by suitable control means while the spout 73 may be continuously shifted laterally from side to side also in a continuous controlled fashion. The control means for controlling this operation are not shown but it is pointed out that such controls are of well known construction. It is also pointed out that the various hydraulic cylinder and piston units are connected to the hydraulic system of the tractor and are controlled by suitable control valves located on the tractor. It is further pointed out that both the lateral and vertical movement of the deflector 74 will be synchronized with the movement of the compaction roller 55. For example, the deflector will be synchronized to direct hay or other material forwardly of the compaction roller 55.

As the hay is discharged into the wagon box 11, the compaction roller 55 will be continuously rotated throughout substantially the entire length of the stack wagon in a fore or advance direction and aft or return direction. Thus it will be seen that the compaction roller will continuously compact the hay as it is being collected thereby forming the hay into a very compact dense stack. When the hay has substantially filled the wagon box 11, the rear doors 31 may be shifted to the open position and the conduit 67a which are connected to the hydraulic motor 67 which drives the compaction roller 55 may be readily disconnected therefrom by an operator. In this regard, the couplings between the hydraulic motor 67 and the conduit 67a are of the quick disconnect type thus permitting ready disconnection of the conduits from the fittings on the motor.

The double acting hydraulic cylinders or rams 45 may be actuated to extend the piston rods and thus cause tilting of the wagon from the position illustrated in FIG. 2 to the rearward inclined position illustrated in FIG. 8. When this occurs, the compaction mechanism 54 may be readily rolled from the stack wagon since the wagon and the upper surface of the formed stack will be in the rearwardly inclined position. The hydraulic motor 50 for operating the endless belt conveyor 48 will be energized to drive the upper run of the conveyor in a rearward direction. The tractor and the hay stack wagon will then be moved forwardly thus causing unloading of the formed stack upon the surface of the ground. Since the hay has been continuously compacted as it was collected, the stack will be of very stable construction. After the stack has been unloaded, the compaction mechanism may be positioned interiorly of the wagon box and the doors 31 may then be closed to permit formation of the next stack.

When it is desirable to reload a formed stack, suitable valves or controls will be operated to extend the piston rods 25 of the double acting hydraulic cylinders 24. This shifts the side walls outwardly thus increasing the width dimension of the wagon box. The double acting hydraulic cylinders 45 may be actuated to extend the piston rods 46 to again tilt the wagon box to the rearwardly inclined position. The stack wagon may then be moved rearwardly until the rear end of the endless belt conveyor is urged under one end of the formed stack and the hydraulic motor 50 which operates the endless belt conveyor may be operated to move the upper run of the endless belt conveyor in a forward direction. As the hay stack is moved forwardly into the wagon box by the endless belt conveyor, the tractor and the hay stack wagon will be moved rearwardly thus permitting progressive loading of the stack into the box. It is pointed out that although the formed stack when deposited upon the surface of the ground will be in a relatively compact condition, there may be some slight settling of the stack which results in an increase of the width dimension of the stack. However, by merely shifting the side walls outwardly (only a matter of a few inches) the wagon will easily accommodate and receive the stack. After the stack has been reloaded into the wagon box, the double acting hydraulic rams 24 may be actuated to retract piston rods and return the side walls to their normal position.

Figure 10:
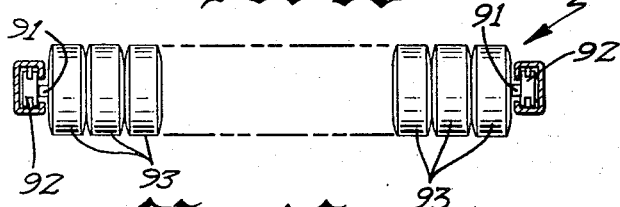
FIG. 10 is a front elevational view of a different embodiment of the compacting roller structure.

Referring now to FIG. 10, it will be seen that a different embodiment of the compaction roller structure is there shown and is designated generally by the reference numeral 90. This roller structure also includes an axle 91 which has slide blocks 92 affixed to opposite ends thereof and which are movable in the tracks 60. It is pointed out that the slide blocks 92 are substantially identical in construction and operation to the slide blocks 58. Thus the embodiment illustrated in FIG. 10 differs from the previously described embodiment of the compaction mechanism only in the construction of the roller structure. It will therefore be seen that conventional wheel mounted tires 93 are provided in place of the drum type roller structure illustrated in the embodiment of FIGS. 1 through 9. Each of the tires may be filled with a suitable liquid to increase the weight thereof or alternatively may merely be filled with air. The compaction roller 55 may also have its weight varied by adding a solid or liquid to the interior thereof. It is also pointed out that the hay stack formed through the use of the compaction roller 55 or the compaction roller 90 will have a convex upper surface in a transverse direction. This configuration of the upper surface of the haystack is controlled by controlling the distribution of the hay from the pick up device. More hay will be distributed along the longitudinal center line of the box than in the lateral portions thereof so that a slight crowning effect will take place in a transverse direction.

Figure 11:
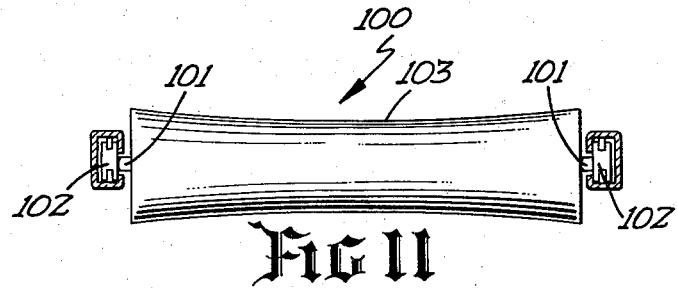
FIG. 11 is a front elevational view of another embodiment of the compacting roller structure.
Figure 12:
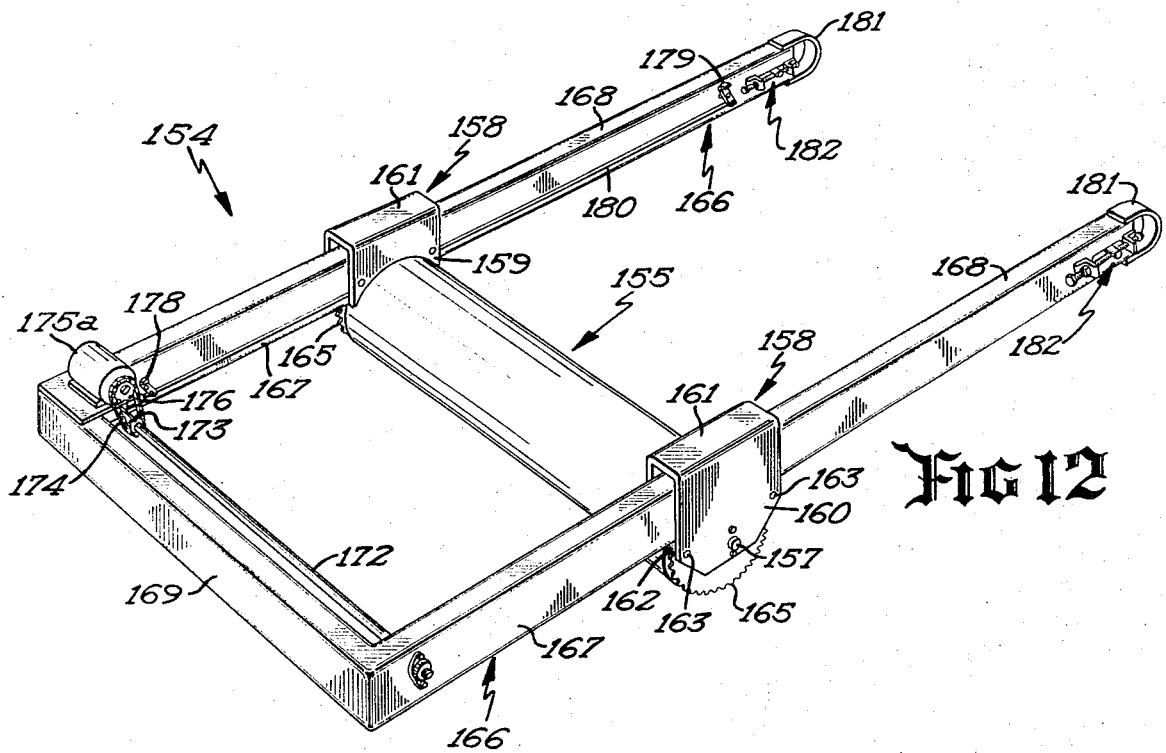
FIG. 12 is a perspective view of a different embodiment of the compaction mechanism.

Referring now to FIG. 11, it will be seen that a further embodiment of the roller structure, designated generally by the reference numeral 100, is there shown. The roller structure 100 comprises an elongate drum which is journalled on a axle 100 having slide blocks 102 affixed to opposite ends thereof. The slide blocks are identical in construction to the slide blocks 58 and movable in tracks 60 in the identical manner of the previously described embodiment. It will be seen that the roller structure 11 is of hour glass configuration and presents a generally concave exterior surface 103. It will be noted that the greatest degree of concavity is located at the mid portion of the roller structure which facilitates the formation of a hay stack having a convex upper surface in a transverse direction. The configuration of the roller structure 100 facilitates the formation of the transverse crowning effect.

From the foregoing description, it will be seen that I have provided a novel towed type hay stack wagon which is provided with a compaction mechanism that continuously compacts the hay as it is collected and therefore results in the formation of a very compact stable stack. It will also be seen that the present hay stack wagon not only permits ready unloading of the formed stack from the wagon box but is arranged and constructed to permit reloading of the stack into the wagon. By lateral extension of the side walls, hay stacks can be reloaded even though the hay stacks have been subjected to a settling effect which increases their original width dimension. It is also pointed out that the stack wagon is also effected in forming stable stacks of corn stalks, cotton or the like.

Referring now to FIGS. 12 through 15, it will be seen that another embodiment of the compaction mechanism, designated generally by the reference numeral 154 as there shown. This compaction mechanism 154 also includes an elongate generally cylindrical compaction roller structure 155 and is provided with an axle 157. The compaction roller structure 155 is provided with a parallel inverted channel shaped mounting member at its outer ends, each mounting member including an inner side wall 159, an outer side wall 160 and a top wall 161. It will be seen that the axle 157 of the roller structure projects through and is journaled in the outer side wall 160.

Each mounting member 158 is provided with a pair of guide rollers 162, each having an axle 163 which is journaled in the inner and outer side walls of each mounting member. It ill be noted that the outer end portions of the roller structure 155 are reduced as at 164 and each end has a sprocket 165 affixed thereto for rotation therewith. It will be noted that the sprockets 165 correspond in size to the cross-sectional size of the roller structure 155.

The compaction mechanism 154 also includes the U-shaped track structure comprised of a pair of elongate generally inverted channel shaped tracks 166, each including a pair of vertically exposed flanges 167 interconnected by a web 168. The transverse member 169 rigidly interconnects the tracks 166 at their respective front ends.

The means for driving the compaction roller structure 155 includes a pair of endless drive chains 170 each being trained about a pair of sprockets 171 which are journaled in the respective front and rear ends of each track 166. It will be noted that each drive chain 170 also is trained below each of the guide rollers 162 journaled each mounting member 158 and each drive chain is then trained about the upper portion of each sprocket 165. Thus it will be seen that when the drive chains are driven in one direction, the compaction roller will be driven relative to the tracks.

It will be noted that the forward pair of sprockets for the tracks 166 are interconnected by interconnecting rod or axle 172. This interconnecting axle 172 has a sprocket 173 affixed thereto for rotation therewith. An endless chain 174 is trained about sprocket 173 and about a drive sprocket 173 which is affixed to the output shaft of the hydraulic motor 175a. The rotary hydraulic motor 175a is reversible and when driven in one direction, would cause the roller structure 155 to be driven rearwardly and when driven in the opposite direction would cause the roller structure 155 to be driven in a forward direction.

The hydraulic motor 175 a is provided with a two-way control valve 176 having an actuator 177. When the actuator 177 is in an extended position, the hydraulic motor will be driven in one direction and when the hydraulic motor is in a retracted position, the hydraulic motor will be driven in the opposite direction.

Figure 14:
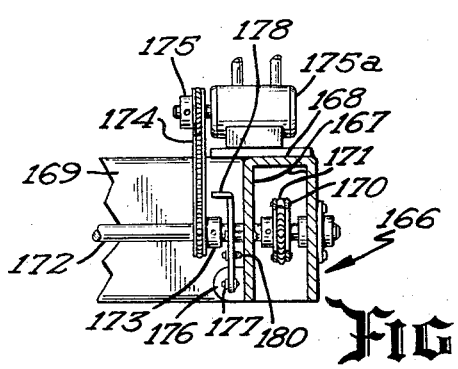
FIG. 14 is a cross-sectional view taken approximately along line 14—14 of FIG. 2 and looking in the direction of the arrows.
Figure 15:
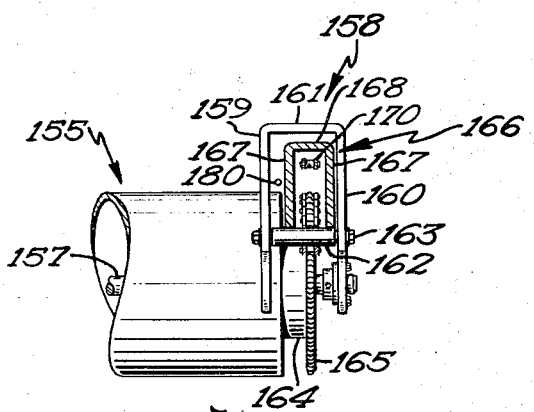
FIG. 15 is a cross-sectional view taken approximately along line 15—15 of FIG. 2 and looking in the direction of the arrows.

A front arm 178 is mounted on the inner surface of the inner flange of one of the tracks 166 adjacent the front end thereof. A rear arm 179 is pivotally mounted in the same track 166 adjacent the rear end thereof and an elongate interconnecting rod 180 pivotally interconnects the arm 178 with the arm 179. The arms 178 and 179 each have an outwardly projecting portion adjacent its upper end as best seen in FIG. 14 whih is disposed in confronting relation with respect to the inner side wall 79 of the associated mounting member 158. It will therefore be seen that the inner side wall 159 of the mounting member 158 will engage in shifting the front and rear arms at the terminal portion of the travel of the compaction roller structure 155 in both rearward and forward directions. When this happens, the hydraulic motor will be immediately reversed so that the compaction roller is driven in the opposite direction.

The rear ends of the tracks 156 are each provided with a curved guard member 181 and these guard members serve as bumper surfaces for the track members during the operation of the compaction mechanism. Each of the tracks 166 is also provided with a pair of chain tighteners 182 which are connected to the rear sprockets to permit longitudinal shifting of the sprockets 171 relative to their associated tracks and thereby selectively tighten the chains 170.

Figure 13:
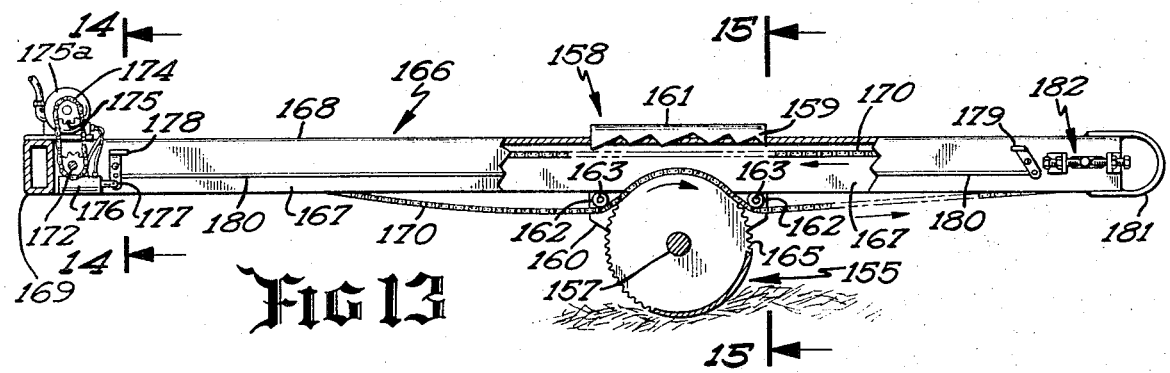
FIG. 13 is a longitudinal cross-sectional view of embodiment illustrated in FIG. 12 with certain parts thereof broken away for clarity.

In operation, the reversible hydraulic loader would be energized to cause the compaction roller 155 to move relative to the tracks 156. If the compaction roller structure 155 is being driven in a rearward direction, the upper run of the drive chains 170 will be moved in a forward direction as best seen in FIG. 13 thus causing rearward movement of the roller structure. Action of the chains on the roller structure is a pulling action and since the roller structure is moved relative to the tracks 166, there is a tendancy of the track 166 to be shifted in the opposite direction. However, this movement is limited by engagement of the ends of the tracks with the front end and rear walls of the hay stack wagon.

Figure 16:
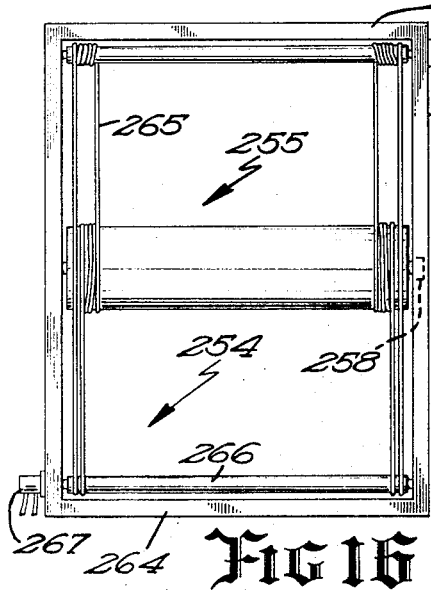
FIG. 16 is a top plan view of a different embodiment of the compaction mechanism.

Referring now to FIG. 16, it will be seen that a different embodiment of the compaction mechanism, designated generally by the reference numeral 254 is there shown. The compaction mechanism illustrated in FIG. 16 also includes an elongate drum type compaction roller structure 255 having an axle 257 which is provided with slide blocks 258 which are disposed within a pair of channel-shaped tracks 260. The tracks 260 are rigidly interconnected together at their respective opposite ends by transverse members 64.

The means for moving the roller and the slide blocks relative to the track members comprises a pair of cables 265 each being wound upon the compaction roller adjacent one end thereof and each cable also being wound upon an end portion of a pair of driven rollers 266. It will be noted that each driven roller 266 has its axle journaled in the tracks 260 adjacent one end of the tracks and that each roller is driven by a reversible rotary hydraulic motor 267. The rotary hydraulic motors are each mounted on one of the tracks 260 adjacent one end thereof. In the embodiment shown, one hydraulic motor 267 is mounted on one track 260 while the other hydraulic motor 267 is mounted on the opposite track 260 and is therefore spaced diagonally from the first hydraulic motor.

It will be seen that by alternately driving the hydraulic motors 267, the compaction roller 255 may be driven in a fore and aft direction.

Thus it will be seen that I have provided a novel hay stack wagon which is not only of simple and inexpensive construction, but one which functions in a more efficient manner than any heretofore known comparable device.

What is claimed is:

1. A hay stack wagon adapted to be towed by a prime mover and adapted to receive hay from a hay pickup device, comprising a generally rectangular shaped wagon box including a bottom wall, upstanding substantially parallel side walls, a front wall, and a top wall, an opening defined between the upper edge of said front wall and said top wall and being of a size to accommodate the discharge spout of a hay pickup device, a closure structure shiftably mounted on said box at the rear end thereof for closing the same and being swingable between open and closed positions, ground engaging wheels, means connecting the ground engaging wheels with said box to permit tilting of the box about a pivotal axis extending transversely of the box between a normal horizontal position and a rearwardly inclined position, means connected with said box for tilting the box about said pivotal axis between said normal horizontal and said rearwardly inclined positions, compacting mechanism within said box comprising a revolvable compacting roller structure extending transversely of said box and having a length dimension corresponding substantially to the interior width dimension of the box, reversible drive means drivingly connected with said roller structure to drive said roller structure along the surface of the hay continuously in rearward and forward directions to continuously compact the hay in the wagon box as the latter is being filled with hay.

2. The hay stack wagon as defined in claim 1 wherein said roller structure comprises a cylindrical drum.

3. The hay stack wagon as defined in claim 1 wherein said roller structure comprises a plurality of wheels.

4. The hay stack wagon as defined in claim 1 wherein said roller structure comprises an elongate drum of circular cross-sectional configuration and tapering uniformly from the ends thereof to the midportion.

5. The hay stack wagon as defined in claim 1 wherein said compaction mechanism comprises elongate track means extending longitudinally of said wagon box, said roller structure having means thereon engaging said track means to guide said roller structure during its fore and aft movement along the surface of the hay.

6. The hay stack wagon as defined in claim 1 and conveyor means mounted in said wagon box adjacent said bottom wall and extending longitudinally of said wagon box, reversible drive means connected with said conveyor means for selectively driving the conveyor means in opposite directions to permit unloading of the formed stack from the wagon and to permit reloading a hay stack into the wagon.

7. The hay stack wagon as defined in claim 1 wherein said side walls are laterally shiftable towards and away from each other.

8. The haystack wagon as defined in claim 1 wherein said compaction mechanism comprises a stack structure including a pair of elongate spaced apart tracks rigidly connected together and extending longitudinally of said wagon box, a pair of longitudinally spaced apart drive rollers journaled on said track structure adjacent opposite ends thereof for revolving movement relative thereto, cables wound upon said drive rollers and upon said compacting roller structure, a power means drivingly connected with each of said drive rollers for alternately driving each of said drive rollers to thereby cause forward and rearward rolling movement of said compacting roller structure.

9. A hay stack wagon adapted to be towed by a prime mover and adapted to receive hay from a hay pickup device, comprising a generally rectangular shaped wagon box including a bottom wall, upstanding substantially parallel side walls, a front wall, and a top wall, an opening defined between the upper edge of said front wall and said top wall and being of a size to accommodate the discharge spout of a hay pickup device, closures structure shiftably mounted on said box at the rear end thereof for closing the same and being shiftable between open and closed positions, means interconnecting said side walls with at least one of said top and bottom walls to permit lateral shifting movement of the side walls towards and away from each other, ground engaging wheels, means connecting the ground engaging wheels with said box to permit tilting of the box about a pivotal axis extending transversely of the box between a normal horizontal position and a rearward inclined position, means connected with said box for tilting the box about said pivotal axis between said normal horizontal position and said rearward inclined position, an endless loading and unloading conveyor means mounted in said wagon adjacent said bottom wall and extending longitudinally of said wagon box, reversible drive means connected with said conveyor means for selectively driving the conveyor means in an unloading direction when said wagon is in a rearward tilted position to permit unloading of a hay stack formed within said box, said drive means when reversed, driving said conveyor means in a loading direction, and serving to load a hay stack intact into the wagon box when the wagon is in the tilted position and when the side walls have been shifted away from each other, a compacting mechanism including a roller structure positioned within said wagon and having a length corresponding substantially to the width of said wagon box, reversible drive means drivingly connected with said roller structure to drive said roller structure along the surface of the hay in forward and reverse directions to continuously compact the hay in the wagon box as the latter is being filled with hay.

10. A haystack wagon adapted to be towed by a prime mover and adapted to receive hay from a hay pickup device, comprising a generally rectangular shaped wagon box including a bottom wall, upstanding substantially parallel opposed vertical side walls, front and rear opposed vertical walls, and a top wall, an opening defined between the upper edge of said front wall and said top wall and being of a size to accommodate the discharge spout of a hay pickup device, one of said vertical walls comprising a closure structure shiftably mounted on said box and being swingable between open and closed positions, ground engaging wheels, means connecting the ground engaging wheels with said box to permit travel thereof over the surface of the ground, compacting mechanism within said box comprising a revolvable compacting roller structure extending transversely of said box and having a length dimension corresponding substantially to the interior dimension of the box, between two of said opposed vertical walls, reversible drive means drivingly connected with said roller structure to drive said roller structure along the surface of the hay continuously between a pair of opposed vertical walls in advanced and return directions to continuously compact the hay in the wagon box as the latter is being filled with hay.

* * * * *